US011391225B2

(12) United States Patent
Holzinger et al.

(10) Patent No.: US 11,391,225 B2
(45) Date of Patent: Jul. 19, 2022

(54) METHOD AND CONTROL UNIT FOR OPERATING A VEHICLE

(71) Applicant: Bayerische Motoren Werke Aktiengesellschaft, Munich (DE)

(72) Inventors: Tobias Holzinger, Munich (DE); Matthias Mersch, Huemmel (DE); Thomas Scheuer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/264,409

(22) PCT Filed: Jul. 15, 2019

(86) PCT No.: PCT/EP2019/068929

§ 371 (c)(1),
(2) Date: Jan. 29, 2021

(87) PCT Pub. No.: WO2020/025299

PCT Pub. Date: Feb. 6, 2020

(65) Prior Publication Data

US 2022/0112849 A1 Apr. 14, 2022

(30) Foreign Application Priority Data

Jul. 30, 2018 (DE) ..................... 10 2018 212 642.9

(51) Int. Cl.
*B60T 7/12* (2006.01)
*F02D 29/02* (2006.01)

(52) U.S. Cl.
CPC .......... *F02D 29/02* (2013.01); *F02D 2200/06* (2013.01)

(58) Field of Classification Search
CPC ............. F02D 41/3854; F02D 41/3082; F02D 2200/0608; F02D 2200/023; F02D 2200/021; F02M 37/20; F02M 63/0265
See application file for complete search history.

(56) References Cited

U.S. PATENT DOCUMENTS

| | | | | |
|---|---|---|---|---|
| 2002/0137405 A1* | 9/2002 | Kanno | F02B 61/045 | 440/84 |
| 2008/0032245 A1* | 2/2008 | Bushnell | F23D 11/44 | 431/11 |
| 2008/0092858 A1* | 4/2008 | Satoh | F02M 25/0809 | 123/520 |

FOREIGN PATENT DOCUMENTS

| | | |
|---|---|---|
| DE | 10 2007 049 705 A1 | 4/2009 |
| DE | 10 2008 054 796 A1 | 6/2010 |
| EP | 1 610 125 A1 | 12/2005 |
| WO | WO 2008/074544 A1 | 6/2008 |

OTHER PUBLICATIONS

PCT/EP2019/068929, International Search Report dated Oct. 4, 2019 (Two (2) pages).

(Continued)

*Primary Examiner* — John Kwon
(74) *Attorney, Agent, or Firm* — Crowell & Moring LLP

(57) ABSTRACT

A method for operating a vehicle having a gasoline engine includes determining a density of a gasoline to be combusted in the gasoline engine, determining a stoichiometric air demand, determining a critical temperature from the density of the gasoline to be combusted and the stoichiometric air demand, and adapting countermeasures to prevent vapor bubbles based on the determined critical temperature.

10 Claims, 8 Drawing Sheets

(56) References Cited

OTHER PUBLICATIONS

Stefan Pischinger. “Verbrennungsmotoren—Vorlesungsumdruck”, Aachen.: Rheinisch-Westfalische Technische Hochschule Aachen, Oct. 1, 2000, with an English Statement of Relevancy, pp. 32-41 and 70-75, XP055625050.

* cited by examiner

METHOD AND CONTROL UNIT FOR OPERATING A VEHICLE

BACKGROUND AND SUMMARY OF THE INVENTION

The present invention relates to a method for operating a vehicle having a gasoline engine.

The formation of vapor bubbles in the gasoline supply system is to be avoided, inter alia, for good hot start behavior of gasoline engines. For this purpose, the temperature is typically kept below a critical temperature, in particular at critical points, of the gasoline supply system by countermeasures, from which vapor bubbles can form in the gasoline to be combusted.

The limiting temperature from which vapor bubbles form in the gasoline to be combusted is dependent on the composition of the gasoline used. The critical temperature is therefore typically selected to be a constant temperature, which is lower than the limiting temperature of the gasoline having the lowest limiting temperature.

In many cases, countermeasures are therefore taken, which would not yet actually have to be taken to avoid vapor bubbles in the case of the gasoline actually used.

For example, the document WO 2008 074544 A1 describes a method for operating a fuel system for an internal combustion engine, in which the fuel is conveyed in an operating state by means of at least one conveyor device into a fuel line, and in which in an idle state of the fuel system, the conveyor device is switched on as a function of at least one state variable, wherein the conveyor device is switched on in the idle state of the fuel system if a state variable, which at least indirectly characterizes a state of the fuel located in the fuel line, falls below a limiting value.

Proceeding therefrom, the present invention is based on the object of specifying a method for operating a vehicle, using which a more appropriate usage of countermeasures to prevent vapor bubble formation is enabled, and a control unit for carrying out the method and a vehicle having such a control unit.

This object was achieved by the subject matter of the independent claims. Advantageous designs of the invention are set forth in the claims referring back to the independent claims.

According to a first aspect, a method for operating a vehicle having a gasoline engine is proposed, wherein the density σ of the gasoline to be combusted is determined, wherein the stoichiometric air demand $L_{St}$ is determined, and wherein a critical temperature is determined from the density σ of the gasoline to be combusted and the stoichiometric air demand $L_{St}$, up to which the formation of vapor bubbles can be avoided in the gasoline to be combusted.

The stoichiometric air demand $L_{St}$ denotes in this case the ratio of the mass of the combusted air $m_{air\text{-}St}$ to the mass of the combusted gasoline $m_B$ with complete combustion of the gasoline: $L_{St}=m_{air\text{-}St}/m_B$.

The stoichiometric air demand $L_{St}$ can be determined from operating parameters of the gasoline engine and provided by an engine control unit of the gasoline engine. The density σ of the gasoline to be combusted can also be provided by the engine control unit or measured by means of a separate sensor.

The critical temperature can thus be determined in consideration of current values ascertainable in the vehicle itself.

The determination of the critical temperature based on the actually used gasoline enables countermeasures for preventing vapor bubble formation to be used more appropriately and in many cases also to be omitted completely. For example, a reduction of a coolant water target temperature of the gasoline engine can be avoided. A period during which an electric fan still runs after the gasoline engine is turned off can also be reduced. Both measures can contribute indirectly to a reduction of the gasoline consumption and thus also of the $CO_2$ consumption of the vehicle.

According to a first design, the critical temperature is determined based on the product of the density σ of the gasoline to be combusted, on the one hand, and the stoichiometric air demand $L_{St}$ raised to a higher power at a factor P, on the other hand. The factor P can be between 0.6 and 0.8. Preferably, the factor P=0.7.

It has been shown that the limiting temperature is strongly correlated in particular with this product. The determination of the critical temperature based on the above-mentioned product can therefore enable particularly efficient adaptation of the countermeasures to prevent vapor bubbles.

A further design provides that the critical temperature is determined based on a continuous function of the product.

The use of a continuous function can enable a simpler regulation of the countermeasures, since a continuous adaptation of the countermeasures to a continuously changing critical temperature is simplified.

Furthermore, a design is proposed in which the critical temperature is determined based on a linear function of the product.

A linear function can simplify the calculation of the critical temperature, so that a simpler control unit can be sufficient for the calculation. In addition, a linear function can enable the calculation of the critical temperature in real time.

Another design provides that the critical temperature is determined based on a polynomial function of the product.

The critical temperature can be approximated still closer to the actual limiting temperatures with the aid of a polynomial function. The elevated computing time, which accompanies the use of a polynomial function in relation to a linear function, can be justified by a further optimizable usage of the countermeasures to prevent the vapor bubble formation.

Furthermore, a design is proposed in which the critical temperature is determined based on a sectionally defined function of the product.

The use of a sectionally defined function can further simplify the calculation of the critical temperature. For example, the sectionally defined function can comprise a first linear section having a first slope and a second linear section having a second slope. It is also conceivable that the sectionally defined function has a first linear section and a second polynomial section.

A further design provides that the critical temperature is determined based on a current date or a date of a last refueling.

Gasoline having differing composition is typically provided by the refineries and/or filling stations in the course of the year, in order to meet the different external temperatures related to the season. The different compositions can be distinguished, inter alia, by a differing limiting temperature.

The consideration of the current date or the date of the last refueling can further improve an estimation of the critical temperature.

Furthermore, a design is proposed, wherein the critical temperature is determined based on the location of the vehicle.

The composition of the gasoline can significantly differ in different regions of the world. The consideration of the location of the vehicle, and thus approximately the location of the production and/or the location of the sale of the gasoline, can thus enable a further improved estimation of the critical temperature. The location of the vehicle can be determined, for example, via sensors present in the vehicle, for example a GPS sensor, or items of location information from mobile wireless devices present in the vehicle. On the other hand, a fixed setting of the region upon delivery or maintenance of the vehicle is also possible, since the vehicles are typically not regularly driven from one region (for example America) to another region (for example Europe).

Furthermore, a control unit for carrying out one of the above-described methods is proposed, as well as a vehicle having such a control unit. The vehicle can be in particular a passenger vehicle or a motorcycle.

Designs and advantages of the invention are explained in greater detail with the aid of the following Figures, which are at least partially schematic:

DETAILED DESCRIPTION OF THE DRAWINGS

Figure 1:
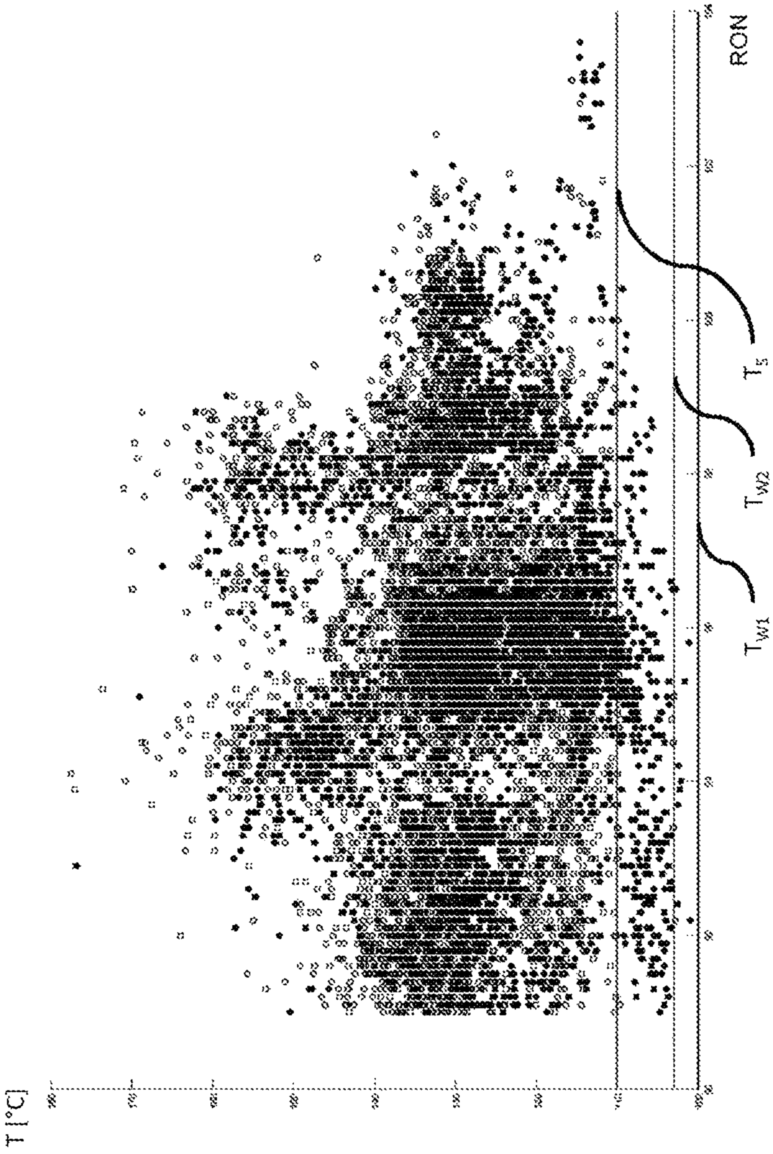
FIG. 1 shows limiting temperatures for a plurality of gasoline samples as a function of the researched octane number (RON)

In FIG. 1, the measured limiting temperature in degrees Celsius (° C.) is plotted over the researched octane number (RON), for a plurality of different gasoline samples from various world regions (USA, China, Russia, EU, remainder of the world). The samples depicted with solid circles were taken in winter here and the samples depicted with empty circles were taken in summer.

A dependence of the limiting temperature on the RON is not recognizable. Further previously selected constant critical temperatures $T_S$, $T_{W1}$, $T_{W2}$ are shown in the diagram. The critical temperature for the summer $T_S$ is selected identically for the various world regions here and is, for example, 110° C. For the winter, a critical temperature $T_{W1}$ is selected for the regions China and USA of, for example, 100° C. and a critical temperature $T_{W2}$ is selected for the regions Russia, EU, and the remainder of the world of, for example, 103° C.

Figure 2:
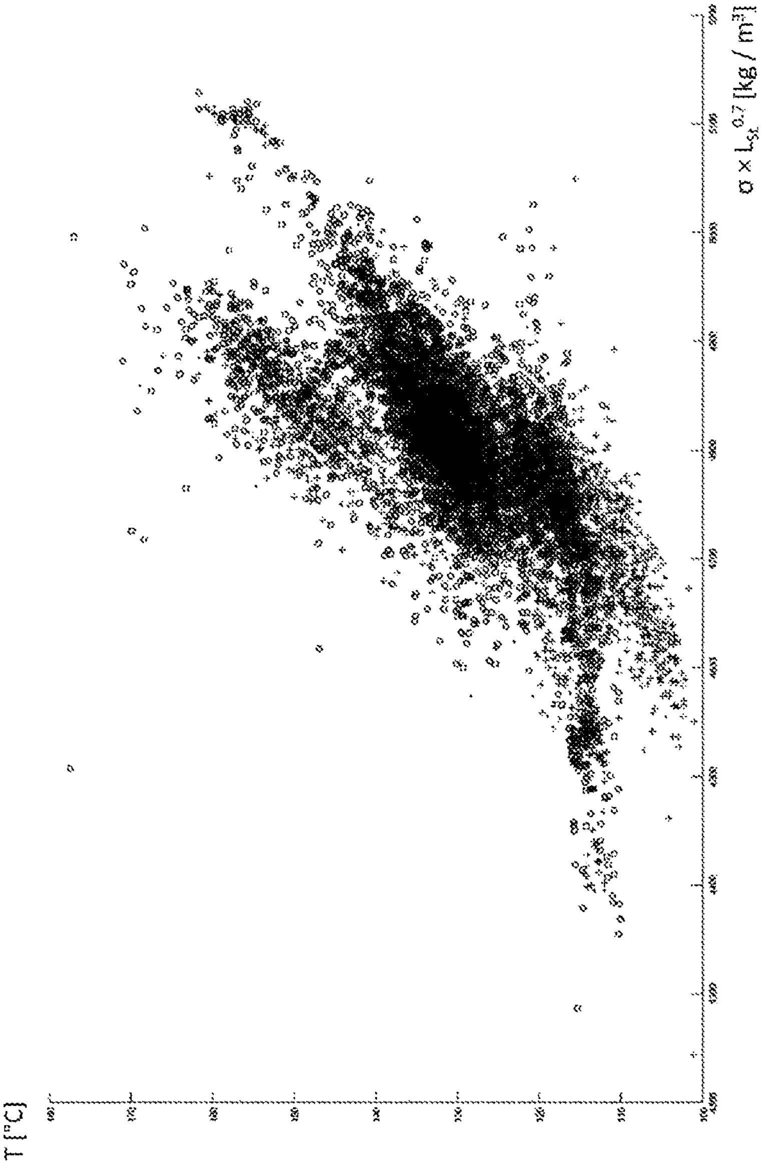
FIG. 2 shows limiting temperatures for a plurality of gasoline samples as a function of the product of the density $\sigma$ of the gasoline to be combusted, on the one hand, and the stoichiometric air demand $L_{St}$ to the power of 0.7, on the other hand.

In FIG. 2, the measured limiting temperatures for the plurality of samples are respectively plotted for samples taken in winter, which are depicted with crosses "+", and for samples taken in summer, which are depicted with circles "o", over the product of the density $\sigma$ of the samples, on the one hand, and the stoichiometric air demand $L_{St}$ to the power of 0.7, on the other hand.

A correlation of the limiting temperature with this product is clearly recognizable.

Figure 3:
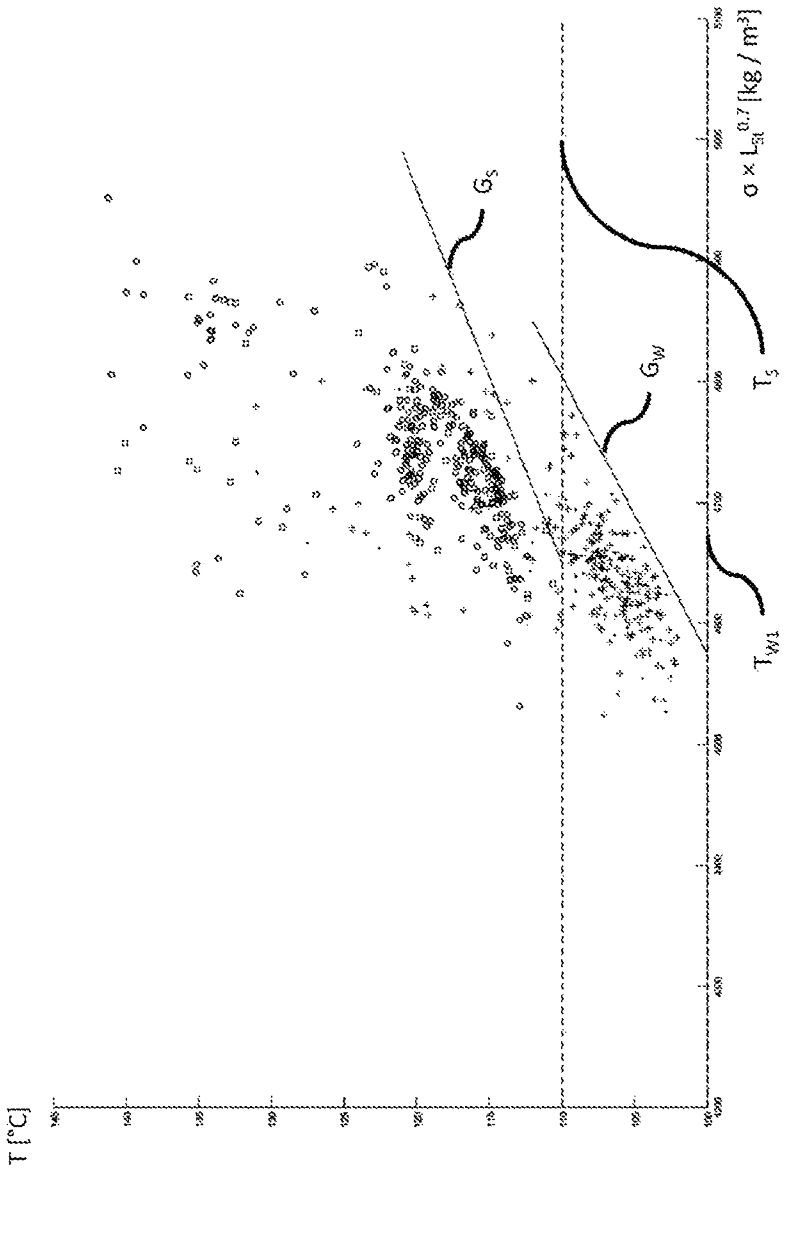
FIG. 3 shows, for the USA region, limiting temperatures for a plurality of gasoline samples as a function of the product of the density $\sigma$ of the gasoline to be combusted, on the one hand, and the stoichiometric air demand $L_{St}$ to the power of 0.7, on the other hand, and also functions for determining the critical temperature.

In FIG. 3, the measured limiting temperatures for a plurality of samples taken in the USA are respectively plotted for samples taken in winter, which are depicted with crosses "+", and for samples taken in summer, which are depicted with circles "o", over the product of the density $\sigma$ of the gasoline samples, on the one hand, and the stoichiometric air demand $L_{St}$ to the power of 0.7, on the other hand. Furthermore, the previously selected, constant critical temperatures for the summer $T_S$ and the winter $T_{W1}$ are shown for this region.

The consideration of the density $\sigma$ of the gasoline and the stoichiometric air demand $L_{St}$ of the gasoline can enable the critical temperature for a plurality of gasoline samples to be selected to be higher than the previously selected constant critical temperature.

A first straight line $G_S$ for determining the critical temperature for the summer is shown in FIG. 3. The straight line is preferably selected here in such a way that at least essentially all determined limiting temperatures for the summer are above the straight line.

The use of the underlying linear function for this straight line for determining the critical temperature (bounded at the bottom by $T_S$) results, for example, in the selection of a higher critical temperature than previously in 93.1% of the samples taken in summer. On average, the critical temperature is increased over the previous constant critical temperature $T_S$ by 3.2° C.

A second straight line $G_W$ for determining the critical temperature for the winter is also shown in FIG. 3. If the linear function underlying this straight line is used for determining the critical temperature (bounded at the bottom by $T_{W1}$), a higher critical temperature is obtained, for example, in 94.1% of the samples taken in winter. On average, the critical temperature is increased over the previous constant critical temperature $T_{W1}$ by 3.6° C. The straight line is preferably selected here in such a way that at least essentially all determined limiting temperatures for the winter are above this straight line.

The higher critical temperature enables countermeasures for preventing vapor bubble formation to be initiated later. Consumption disadvantages accompanying the countermeasures (for example, due to higher power consumption by running electric fans) and comfort losses (for example, due to electric fans continuing to run after the gasoline engine is turned off) can therefore be reduced.

Figure 4:
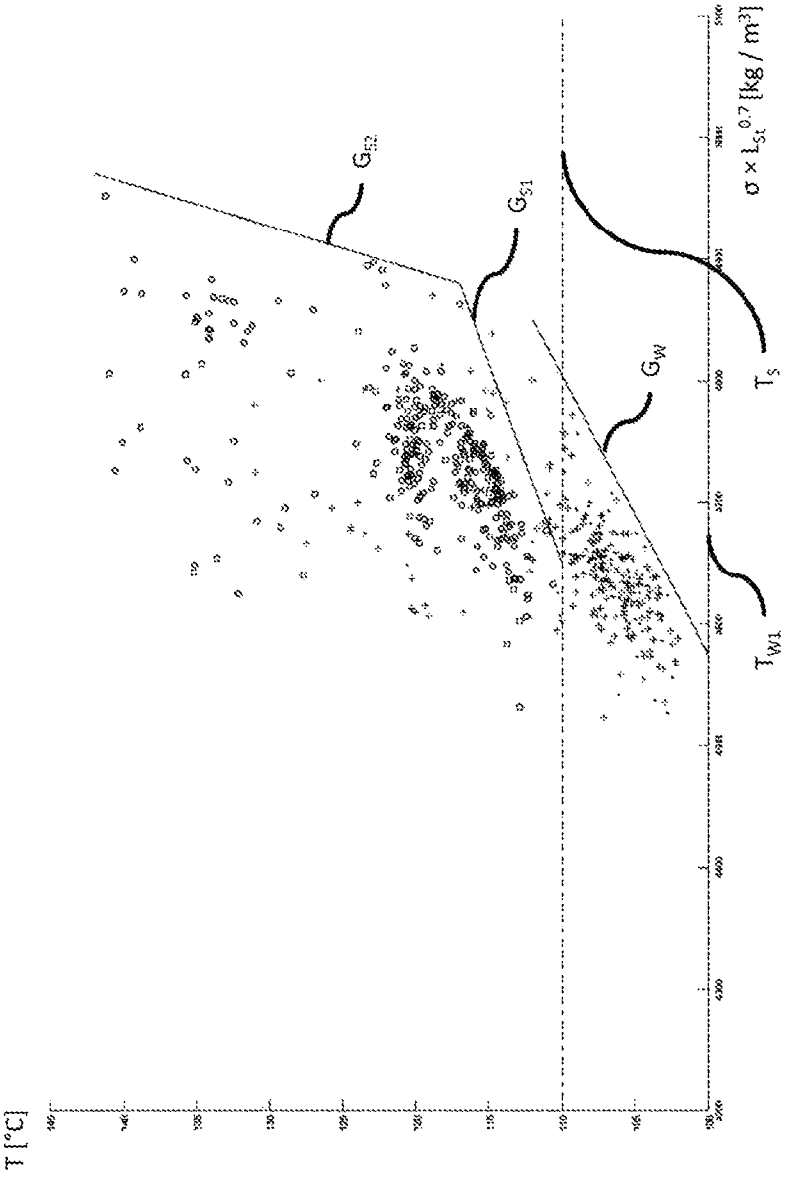
FIG. 4 shows, for the USA region, limiting temperatures for a plurality of gasoline samples as a function of the product of the density $\sigma$ of the gasoline to be combusted, on the one hand, and the stoichiometric air demand $L_{St}$ to the power of 0.7, on the other hand, and also functions for determining the critical temperature.

FIG. 4 once again shows the values of the gasoline samples shown in FIG. 3.

In contrast to FIG. 3, a sectionally defined function of the product of the density $\sigma$ of the gasoline, on the one hand, and the stoichiometric air demand $L_{St}$ to the power of 0.7, on the other hand, is used for determining the critical temperature for the samples taken in summer. In particular, in the exemplary embodiment shown, two linear function sections are used which are visualized by the straight lines $G_{S1}$ and $G_{S2}$ in the diagram. In samples in which the product of the density $\sigma$ of the gasoline, on the one hand, and the stoichiometric air demand $L_{St}$ to the power of 0.7, on the other hand, assumes a very high value, this can enable once again a very clear increase of the critical temperature.

Figure 5:
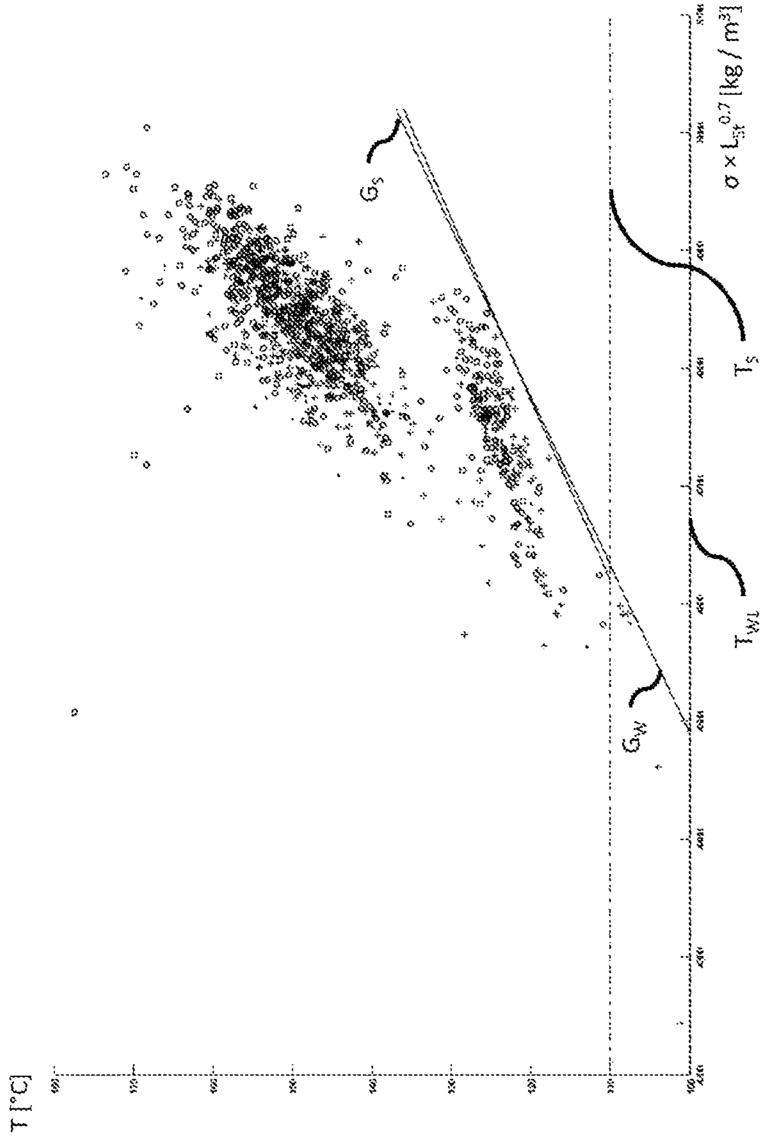
FIG. 5 shows, for the China region, limiting temperatures for a plurality of gasoline samples as a function of the product of the density $\sigma$ of the gasoline to be combusted, on the one hand, and the stoichiometric air demand $L_{St}$ to the power of 0.7, on the other hand, and also functions for determining the critical temperature.

In FIG. 5, the measured limiting temperatures for a plurality of samples taken in China are respectively plotted for samples taken in winter, which are depicted with crosses "+", and for samples taken in summer, which are depicted with circles "o", over the product of the density $\sigma$ of the gasoline samples, on the one hand, and the stoichiometric air demand $L_{St}$ to the power of 0.7, on the other hand. Furthermore, previously selected, constant critical temperatures for the summer $T_S$ and the winter $T_{W1}$ are shown for this region.

A first straight line $G_S$ for determining the critical temperature for the summer is shown. The use of the underlying linear function for this straight line for determining the critical temperature (bounded on the bottom by $T_S$) results in the selection of a higher critical temperature than previously, for example, in 99.2% of the samples taken in summer. On average, the critical temperature is increased in relation to the previous constant critical temperature $T_S$ by 13.8° C.

A second straight line $G_W$ for determining the critical temperature for the winter is shown in a comparable manner. If the linear function underlying this straight line is used to determine the critical temperature (bounded on the bottom by $T_{W1}$), a higher critical temperature is obtained, for example, in 99.7% of the samples taken in winter. On average, the critical temperature increases over the previous constant critical temperature $T_{W1}$ by 22.1° C.

Figure 6:
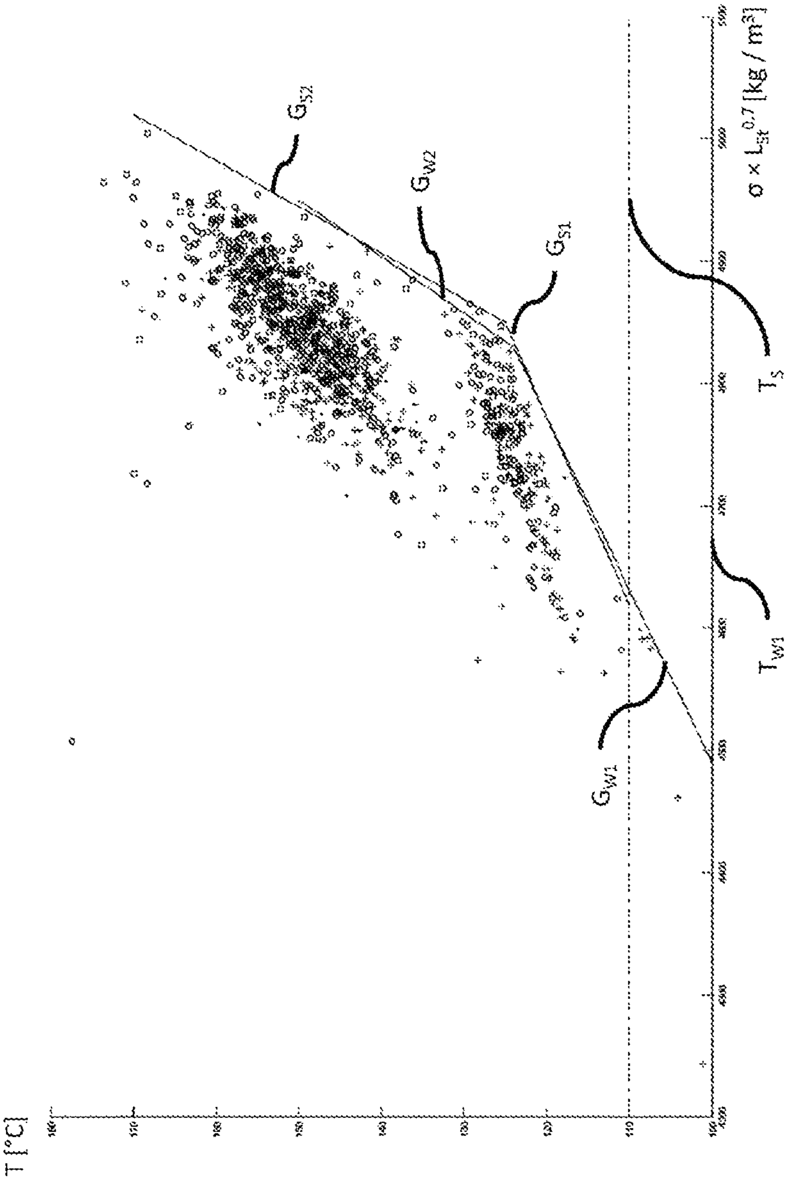
FIG. 6 shows, for the China region, limiting temperatures for a plurality of gasoline samples as a function of the product of the density $\sigma$ of the gasoline to be combusted, on the one hand, and the stoichiometric air demand $L_{St}$ to the power of 0.7, on the other hand, and also functions for determining the critical temperature.

FIG. 6 once again shows the values of the gasoline samples shown in FIG. 5. In contrast to FIG. 5, sectionally defined functions of the product of the density $\sigma$ of the gasoline, on the one hand, and the stoichiometric air demand $L_{St}$ to the power of 0.7, on the other hand, are used to determine the critical temperatures for the samples taken in summer and winter.

In particular, in the exemplary embodiment shown, two linear function sections are used for the summer, which are visualized in the diagram by the straight lines $G_{S1}$ (bounded on the bottom by $T_S$) and $G_{S2}$, and two linear function sections are used for the winter, which are visualized in the diagram by the straight lines $G_{W1}$ (bounded on the bottom by $T_{W1}$) and $G_{W2}$. This results in a further elevation of the average increase of the critical temperature in comparison to the previous constant critical temperature. In particular, the average increase of the critical temperature is 17.5° C. for summer fuels and 24.5° C. for winter fuels.

Figure 7:
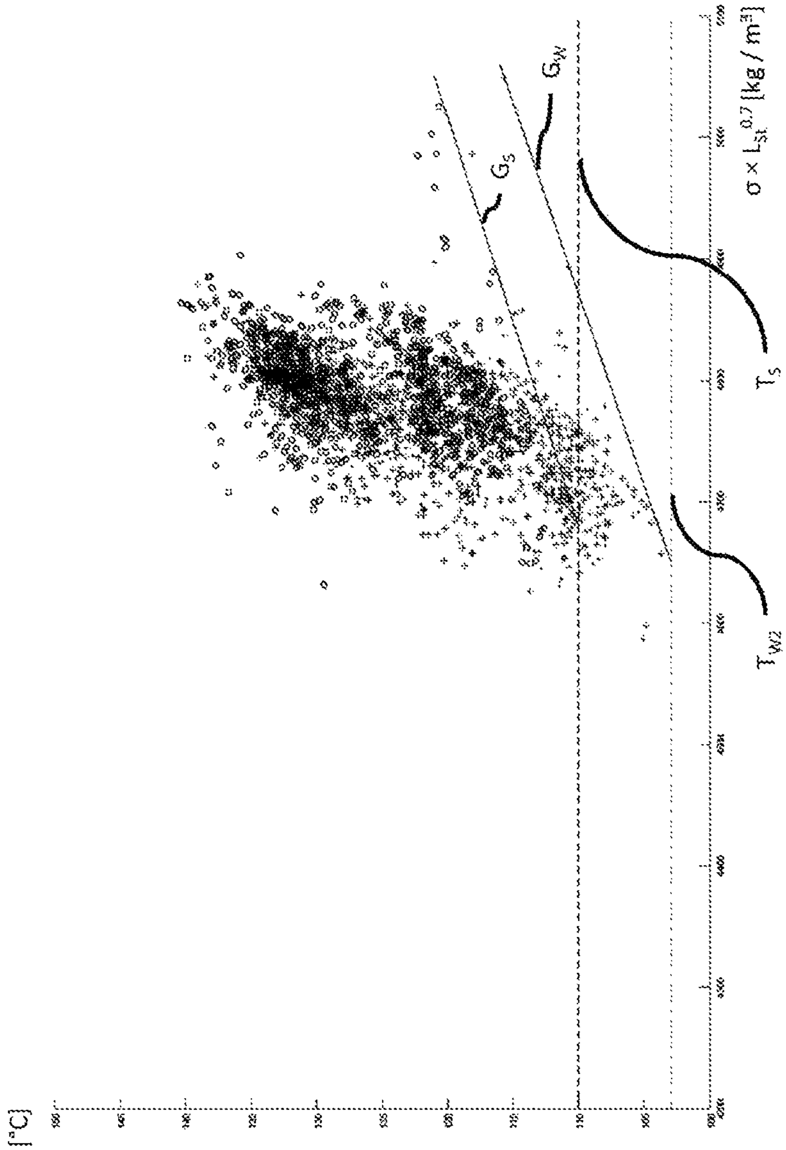
FIG. 7 shows, for the Europe region, limiting temperatures for a plurality of gasoline samples as a function of the product of the density $\sigma$ of the gasoline to be combusted, on the one hand, and the stoichiometric air demand $L_{St}$ to the power of 0.7, on the other hand, and also functions for determining the critical temperature.

In FIG. 7, the measured limiting temperatures for a plurality of samples taken in Europe are respectively plotted for samples taken in winter, which are depicted with crosses "+", and for samples taken in summer, which are depicted with circles "o", over the product of the density $\sigma$ of the gasoline samples, on the one hand, and the stoichiometric air demand $L_{St}$ to the power of 0.7, on the other hand. Furthermore, the previously selected, constant critical temperatures for the summer $T_S$ and the winter $T_{W2}$ are shown for this region.

A first straight line $G_S$ for determining the critical temperature for the summer is shown. The use of the underlying linear function for this straight line for determining the critical temperature (bounded on the bottom by $T_S$) results in the selection of a higher critical temperature than previously, for example, in 99.3% of the samples taken in summer. On average, the critical temperature is increased in relation to the previous constant critical temperature $T_S$ by 3.4° C.

A second straight line $G_W$ for determining the critical temperature for the winter is shown in a comparable manner. If the linear function underlying this straight line is used to determine the critical temperature (bounded on the bottom by $T_{W2}$), a higher critical temperature is obtained, for example, in 99.1% of the samples taken in winter. On average, the critical temperature increases over the previous constant critical temperature $T_{W2}$ by 3.5° C.

Figure 8:
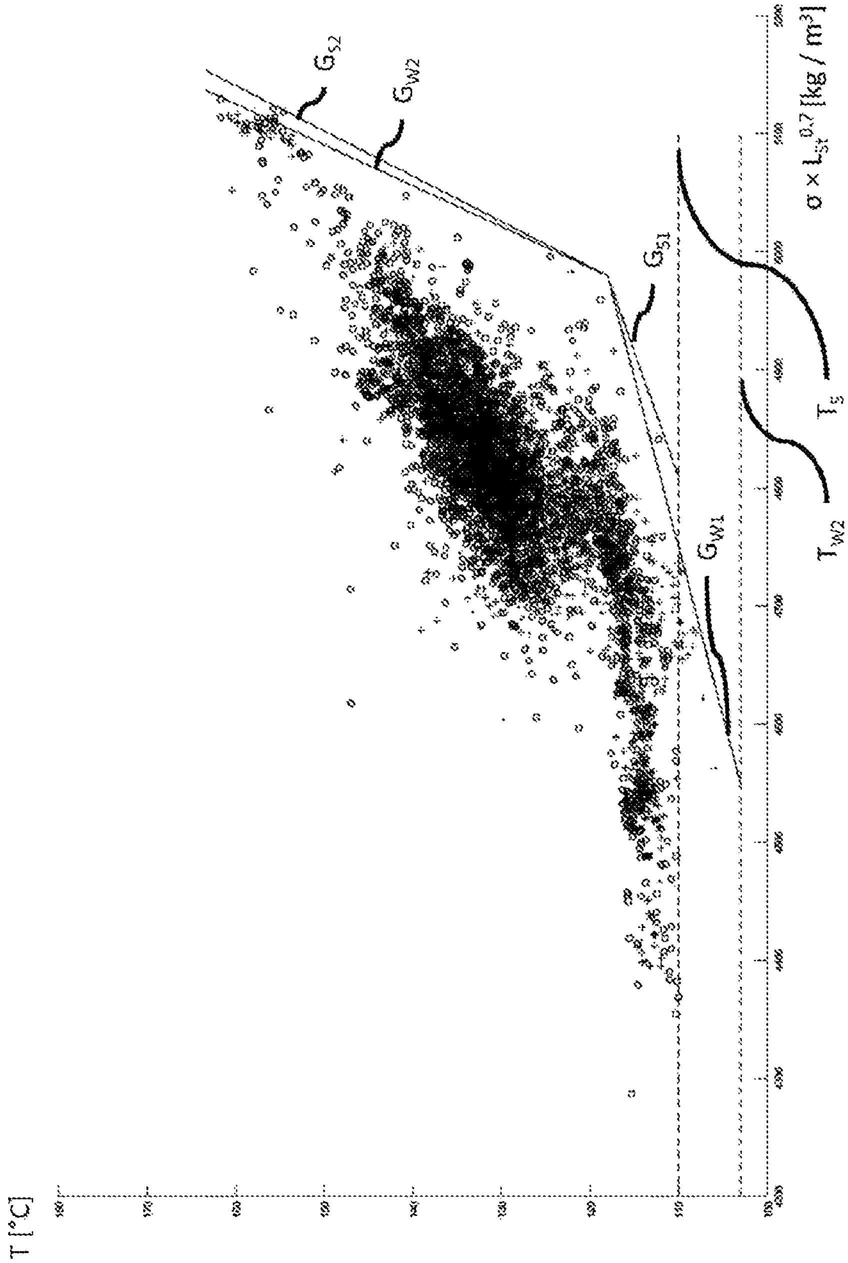
FIG. 8 shows, for regions having restricted fuel quality, limiting temperatures for a plurality of gasoline samples as a function of the product of the density $\sigma$ of the gasoline to be combusted, on the one hand, and the stoichiometric air demand $L_{St}$ to the power of 0.7, on the other hand, and also functions for determining the critical temperature.

In FIG. 8, the measured limiting temperatures for a plurality of samples taken in regions having restricted fuel quality are respectively plotted for samples taken in winter, which are depicted with crosses "+", and for samples taken in summer, which are depicted with circles "o", over the product of the density $\sigma$ of the gasoline samples, on the one hand, and the stoichiometric air demand $L_{St}$ to the power of 0.7, on the other hand. Furthermore, the previously selected, constant critical temperatures for the summer $T_S$ and the winter $T_{W1}$ are shown for this region.

A sectionally defined linear function is used to determine the critical temperature for the summer, which are visualized by the straight line sections $G_{S1}$ (bounded on the bottom by $T_S$) and $G_{S2}$ in the diagram. This results in the selection of a higher critical temperature than previously, for example, in 57.0% of the samples taken in summer. On average, the critical temperature is increased in relation to the previous constant critical temperature $T_S$ by 3.9° C.

A second linear function, also sectionally defined, is used in a comparable manner for the determination of the critical temperature for the winter. Accordingly, two straight line sections $G_{W1}$ (bounded on the bottom by $T_{W2}$) and $G_{W2}$ are shown in FIG. 8. If the linear functions underlying these straight lines are used to determine the critical temperature, a higher critical temperature is obtained, for example, in 93.3% of the samples taken in winter. On average, the critical temperature increases over the previous constant critical temperature $T_{W2}$ by 9.2° C.

What is claimed is:

1. A method for operating a vehicle having a gasoline engine, comprising the steps of:

determining a density of a gasoline to be combusted in the gasoline engine;

determining a stoichiometric air demand;

determining a critical temperature from the density of the gasoline to be combusted and the stoichiometric air demand; and adapting countermeasures to prevent vapor bubbles based on the determined critical temperature.

2. The method according to claim 1, wherein the critical temperature is determined based on a product of the density of the gasoline to be combusted and the stoichiometric air demand to the power of a factor P.

3. The method according to claim 2, wherein the critical temperature is determined based on a continuous function of the product.

4. The method according to claim 2, wherein the critical temperature is determined based on a linear function of the product.

5. The method according to any one of claim 2, wherein the critical temperature is determined based on a polynomial function of the product.

6. The method according to any one of claim 2, wherein the critical temperature is determined based on a sectionally defined function of the product.

7. The method according to any one of claim 1, wherein the critical temperature is determined based on a current date or a date of a last refueling of the vehicle.

8. The method according to any one of claim 1, wherein the critical temperature is determined based on the location of the vehicle.

9. A non-transitory computer-readable medium on which is stored a computer program comprising instructions which, when executed by a computer, perform the method according to claim 1.

10. A control unit of a vehicle configured to perform he method according to claim 1.

* * * * *